United States Patent [19]

Zamarripa et al.

[11] Patent Number: 5,667,176

[45] Date of Patent: Sep. 16, 1997

[54] RADAR DETECTOR UNIT MOUNTING DEVICE FOR ATTACHMENT TO REARVIEW MIRROR

[76] Inventors: Michael P. Zamarripa, 1034 Jackson St., Great Bend, Kans. 67530; Martin R. Mitchell, Rte. 2 Box 111, Ellinwood, Kans. 67526

[21] Appl. No.: 567,084

[22] Filed: Dec. 4, 1995

[51] Int. Cl.[6] ............................................. E04G 5/06
[52] U.S. Cl. ............................. 248/231.51; 248/316.5
[58] Field of Search ........................... 248/231.51, 316.5, 248/229.1, 229.13, 227.4, 227.1, 216.1; 224/929

[56] References Cited

U.S. PATENT DOCUMENTS

| | | | |
|---|---|---|---|
| D. 296,771 | 7/1988 | Dilgard | D10/103 |
| 4,648,572 | 3/1987 | Sokol | 248/206.2 |
| 4,760,497 | 7/1988 | Roston | 361/427 |
| 4,836,482 | 6/1989 | Sokol | 248/206.3 |
| 4,887,753 | 12/1989 | Allen | 224/312 |
| 4,896,855 | 1/1990 | Furnish | 248/206.3 |
| 5,014,947 | 5/1991 | Wang | 248/214 |
| 5,016,850 | 5/1991 | Plahn | 248/206.3 |
| 5,017,144 | 5/1991 | Waidhofer | 439/34 |
| 5,020,754 | 6/1991 | Davis et al. | 248/206.3 |

Primary Examiner—Leslie A. Braun
Assistant Examiner—Willie Berry, Jr.
Attorney, Agent, or Firm—Flanagan & Flanagan

[57] ABSTRACT

A radar detector unit mounting device includes a mounting bracket having upper and lower leg portions connected by a bight portion and defining therebetween a slot for receiving and holding therein the radar detector unit, a connector having an upper female part and a lower male part adapted to fit through the upper leg portion of the mounting bracket and to fasten to the upper female part so as to clamp the connector to the mounting bracket, and a clip having a pair of clamping jaws for releasably attaching to the support structure of a rearview mirror, a hinge for connecting the jaws together to undergo pivotal movement between opened and closed positions, and a pair of spaced apart fingers attached to the jaws on opposite sides of the hinge. The hinge has a lower coupling portion for pivotal attachment of the clip to an upper end of the upper female part of the connector and an upper hinge defining portion supporting an elongated spring between the fingers which forces the fingers away from one another to a displaced position and thereby the jaws to the closed position. By squeezing the fingers of the clip sufficiently to overcome the biasing force of the spring, the fingers are moved toward one another to an adjacent position and thereby the jaws are forced to the opened position.

20 Claims, 2 Drawing Sheets

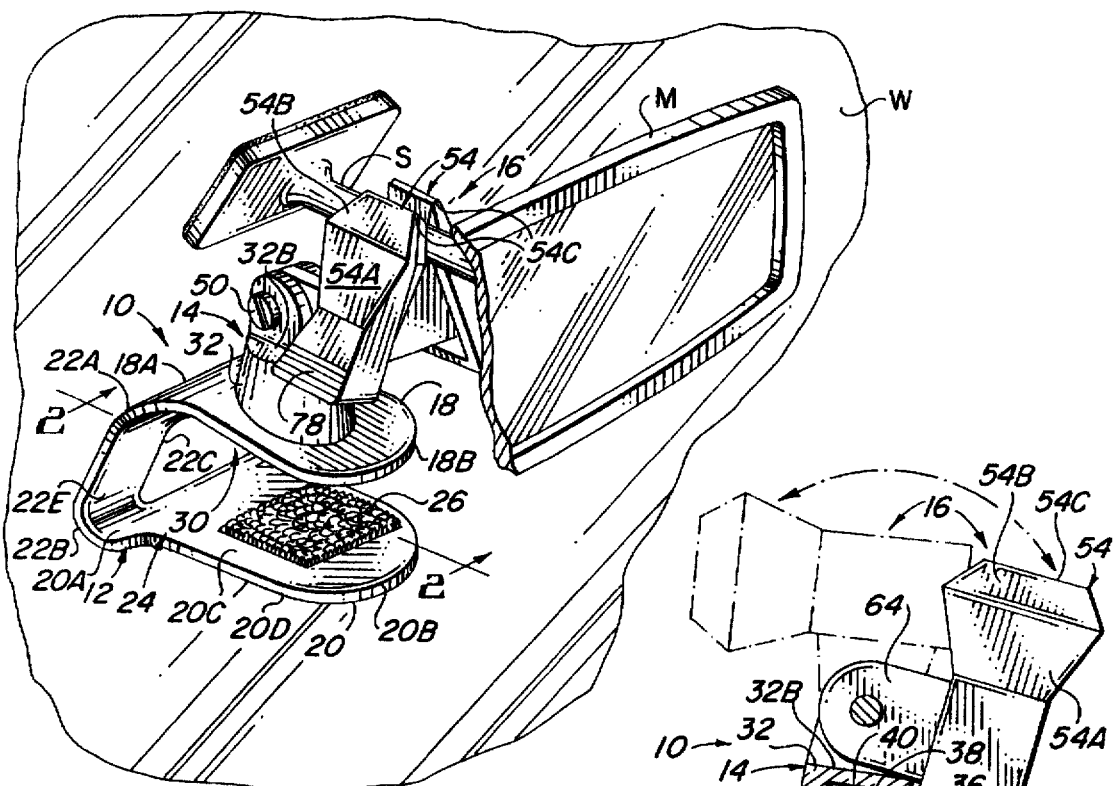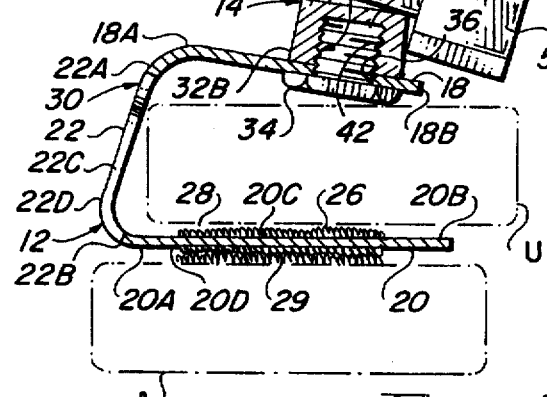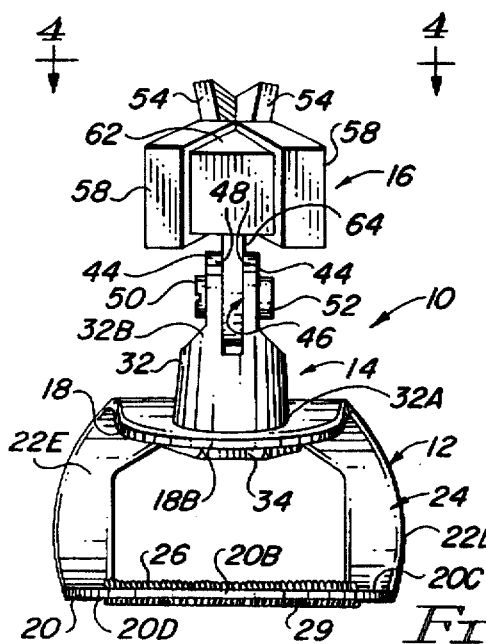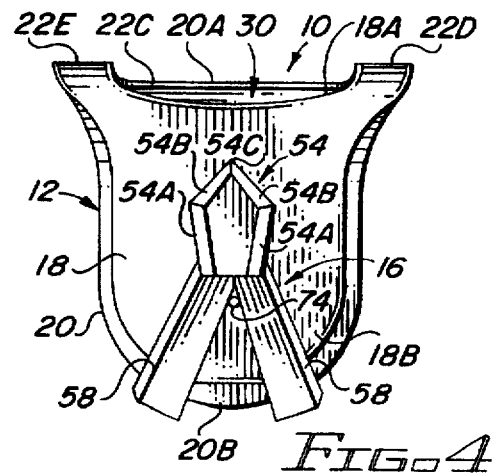

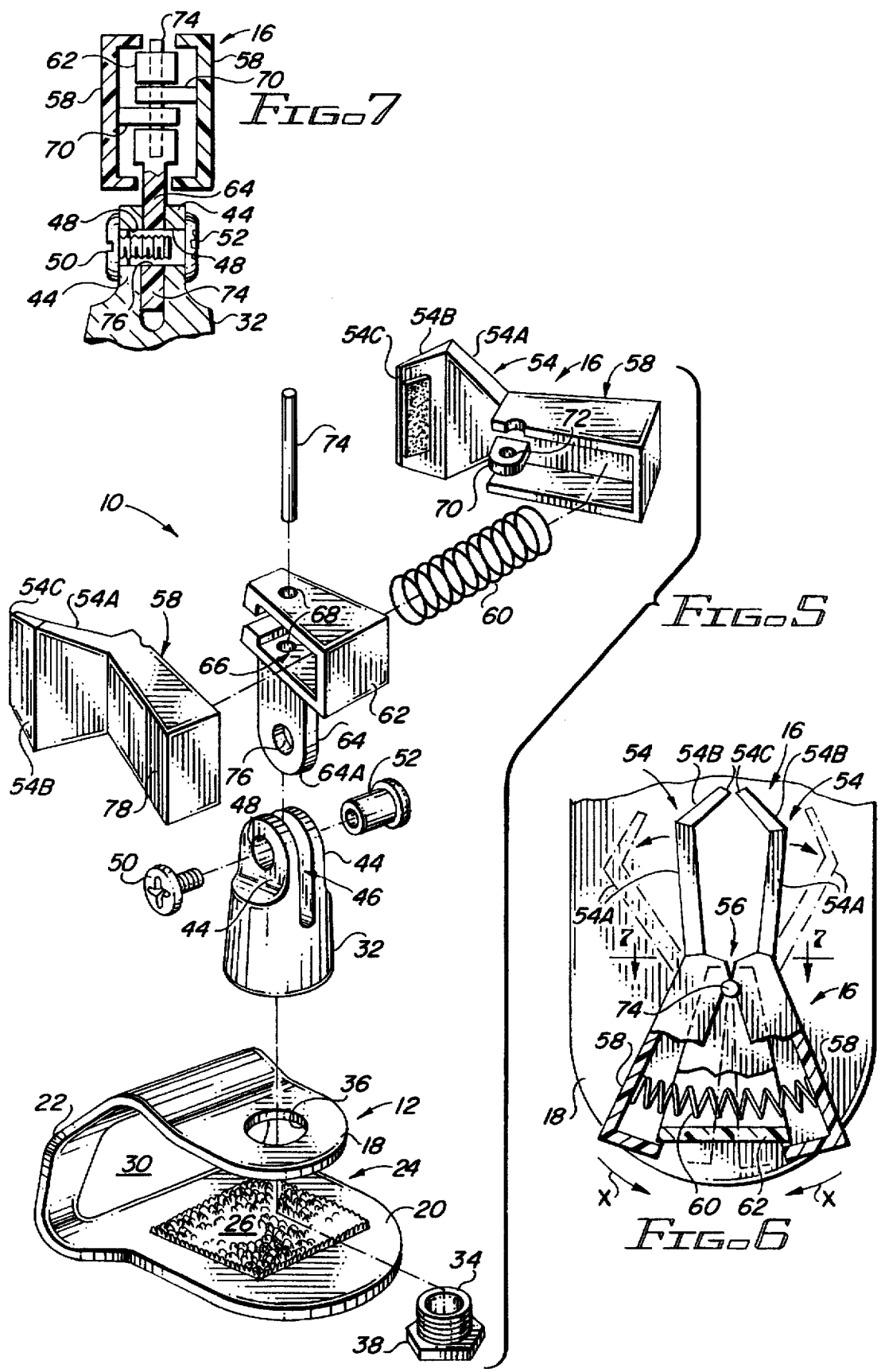

RADAR DETECTOR UNIT MOUNTING DEVICE FOR ATTACHMENT TO REARVIEW MIRROR

BACKGROUND OF THE INVENTION

1. Field of the Invention

The present invention generally relates to mounting devices for radar detector units and, more particularly, is concerned with a radar detector unit mounting device for attachment to a rearview mirror of an automobile.

2. Description of the Prior Art

Radar detector units have been used widely in the general public for years now. In most instances, the unit is not installed by a manufacturer but rather must be installed by the user in a convenient location which permits the operator to activate the unit while driving and permits the unit to function to an optimum degree. This location is generally near the windshield of the vehicle and often requires a means to adequately secure the unit in place.

A variety of devices have therefore been developed over the years which provide a means for mounting radar detector units in locations whereby they can be used for their intended purpose. Representative examples of these devices are disclosed in U.S. Des. Pat. No. 296,771 to Dilgard, U.S. Pat. No. 4,648,572 to Sokol, U.S. Pat. No. 4,760,497 to Roston, U.S. Pat. No. 4,836,482 to Sokol, U.S. Pat. No. 4,887,753 to Allen, U.S. Pat. No. 4,896,855 to Furnish, U.S. Pat. No. 5,014,947 to Wang, U.S. Pat. No. 5,016,850 to Plahn, U.S. Pat. No. 5,017,144 to Waidhofer and U.S. Pat. No. 5,020,754 to Davis et al.

Some of these above mentioned patents disclose mounting devices which attach to a sun visor. A problem exists, however, with this approach in that using a sun visor to hold the radar detector means the sun visor cannot be used for its intended purpose of keeping the sun out of the driver's eyes. Other patents disclose mounting devices which utilize suction cups to attach to the windshield itself. A problem with this approach is that the suction cups may not hold under all climatic conditions and frequently need to be reapplied to the windshield. Still another approach utilizes complementary loop and hook fastening elements applied to the dash and to the radar detector unit. A problem exits with this approach in that it may be difficult to find an unobstructed view and a level position for the device.

Consequently, a need remains for a device which overcomes the aforementioned problems in the prior art without introducing any new problems in their place.

SUMMARY OF THE INVENTION

The present invention provides a radar detector unit mounting device designed to satisfy the aforementioned needs. The radar detector unit mounting device of the present invention is particularly suited, although not so limited, for attachment to a rearview mirror of an automobile. The mounting device also is simple and efficient to use and can accommodate radar detector units of various widths. The mounting device itself can be easily attached to and removed from the rearview mirror and angularly adjusted relative thereto. The mounting device is further versatile in that it can mount most any type of radar detector unit and attach to the rearview mirror of most any automobile model. The mounting device also functions without damaging the interior of the automobile and further provides freedom to fully use the sun visor. Also, the mounting device facilitates direct eye contact of the automobile driver with the radar detector unit without requiring the driver to significantly take an eye off the road ahead.

Accordingly, the present invention is directed to a radar detector unit mounting device for attachment to a rearview mirror of an automobile. The mounting device comprises: (a) a mounting bracket having a pair of upper and lower leg portions vertically spaced apart from one another and a bight portion extending between and connected to a pair of adjacent ends of the upper and lower leg portions so as to define a slot in the mounting bracket for receiving and supporting a radar detector unit therein between said upper and lower leg portions; (b) a connector attached to and extending upwardly from the upper leg portion of the mounting bracket; and (c) a clip attached to the connector and spaced above the mounting bracket, the clip having means for releasably attaching to a support structure of a rearview mirror.

More particularly, the lower leg portion of the mounting bracket has an upper surface disposed in the slot between the upper and lower leg portions and means thereon for removably attaching the radar detector unit so as to releasably secure the radar detector unit in the slot between the upper and lower leg portions of the mounting bracket. The clip includes a pair of clamping jaws for releasably attaching the clip to the support structure of the rearview mirror, a hinge defining means for connecting the jaws together to undergo pivotal movement relative to one another between closed and opened positions; a pair of spaced apart fingers attached to the jaws on opposite sides of the hinge defining means, and means coupled to the fingers for biasing the fingers away from one another to a displaced position so as to force the jaws to assume the closed position. The biasing means also is adapted to yield by squeezing the fingers toward one another to an adjacent position so as to force the jaws to assume the opened position. The connector includes an upper fastening part pivotally connected to the clip and a lower fastening part adapted to fasten to and clamp the upper fastening part upon the upper leg portion of the mounting bracket. The upper fastening part is a female part, whereas the lower fastening part is a male part adapted to fit through a hole in the upper leg portion of the mounting bracket and fit into and fasten to the upper female part so as to clamp the connector upon the upper leg portion of the mounting bracket.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a radar detector unit mounting device of the present invention shown attached to a support structure of a rearview mirror.

FIG. 2 is a side elevational view of the mounting device with a radar detector unit shown in phantom being supported by the device.

FIG. 3 is a front elevational view of the mounting device of FIG. 2 but with an upper attaching clip of the mounting device rotated 90° from a horizontal attachment position of FIG. 2 to a vertical attachment position.

FIG. 4 is a top plan view of the mounting device as seen along line 4—4 of FIG. 3.

FIG. 5 is an exploded perspective view of the radar detector unit mounting device.

FIG. 6 is an enlarged view with portions broken away and sectioned of the upper attaching clip of the mounting device as shown in FIG. 4.

FIG. 7 is a vertical cross-sectional view of the upper attaching clip taken along line 7—7 of FIG. 6.

DETAILED DESCRIPTION OF THE INVENTION

Referring to the drawings and particularly to FIG. 1, there is illustrated a radar detector unit mounting device, generally designated 10, of the present invention. The mounting device 10 is shown attached to a support structure S of a rearview mirror M of an automobile which, in turn, is mounted in a conventional manner to the windshield W thereof. The mounting device 10 basically includes a mounting bracket 12, an articulated arm or connector 14 and an attaching clip 16.

Referring to the FIG. 5, the mounting bracket 12 of the device 10 has a pair of upper and lower leg portions 18 and 20 vertically spaced apart from one another and a bight portion 22 extending substantially upright between and connected at its upper and lower ends 22A, 22B to rear ends 18A, 20A of the upper and lower leg portions 18, 20. The upper and lower leg portions 18, 20 and bight portion 22 together have a substantially C-shaped configuration so as to define a slot 24 in the mounting bracket 12 open at the lateral sides thereof and at the front ends 18B, 20B of the upper and lower leg portions 18, 20 thereof for receiving and supporting a radar detector unit U therein, as shown in phantom in FIG. 2. The bight portion 22 of the bracket 12 is capable of being flexed slightly so as to permit the forcing of the upper and lower leg portions 18, 20 slightly farther apart from each other for facilitating installation and removal of the radar detector unit U therebetween.

The lower leg portion 20 of the mounting bracket 12 has opposite upper and lower flat surfaces 20C, 20D. Attaching means in the form of a patch 26 of hook or loop fastening material is secured on the upper flat surface 20C of the lower leg portion 20 of the mounting bracket 12 for removably attaching thereon the radar detector unit U which likewise has a complementary patch 28 (see FIG. 2) of hook or loop fastening material on the bottom surface thereof. In such manner, the radar detector unit U is releasably secured on the lower leg portion 20 of the mounting bracket 12 in the slot 24 between the upper and lower leg portions 18 and 20 thereof. Optionally, another patch 29 of hook or loop fastening material can be secured on the lower flat surface 20D of the lower leg portion 20 of the mounting bracket 12 for releasably fastening some other accessory A thereto, as shown in phantom in FIG. 2.

The upper and lower leg portions 18, 20 of the mounting bracket 12 further have substantially the same contour with the respective front ends 18B, 20B thereof each having a rounded shape. The lower leg portion 20, however, has a slightly greater area so as to provide enough space for securing of the attaching patch 26 thereon and for the radar detector unit U to rest thereon. The bight portion 22 of the mounting bracket 12 has an opening 30 defined therein by an inner continuous edge 22C for passage therethrough of electromagnetic energy to the radar detector unit U. The opening 30 is at least large enough to permit passage of the electromagnetic energy and preferably is of such large size that only a pair of strip-like side connections 22D, 22E remain to form the bight portion 22 of the mounting bracket 12, which permits a substantial portion if not all of the electromagnetic energy detection end of the radar detector unit U to be exposed to the road ahead through the automobile windshield W.

Referring now to FIGS. 1 to 6, the connector 14 of the mounting device 10 is attached to and extends upwardly from the upper leg portion 18 of the mounting bracket 12. The connector 14 has an upper female fastening part 32 and a lower male fastening part 34 adapted to fit through a hole 36 in the upper leg portion 18 of the bracket 12 and to fit into and fasten to the upper female fastening part 32 so as to clamp the connector 14 onto the upper leg portion 34 of the mounting bracket 12. Further, the lower male fastening part 34 is cylindrical in shape with external threads 38 thereon. A lower end 32A of the upper female part 32 is annular in shape and has a cavity 40 formed therein which is cylindrical in shape and has internal threads 42 formed therein adapted to threadably receive the external threads 38 of the lower male fastening part 34 for clamping the connector 14 to the mounting bracket 12. The upper female part 32 of the connector 14 has an upper end 32B with a bifurcated configuration defined by a pair of side wall portions 44 spaced apart from one another so as to define a slot 46 therebetween. The spaced apart side wall portions 44 further have respective openings 48 defined therethrough in alignment with one another for passage therethrough of a suitable fastener, such as screw 50 and nut 52 shown in FIG. 5.

Referring to FIGS. 1–7, the attaching clip 16 of the mounting device 10 is attached to the connector 14 and spaced above the mounting bracket 12. The clip 16 has means for releasably attaching the mounting device 10 to the support structure S of the rearview mirror M. More particularly, the attaching clip 16 includes a pair of clamping jaws 54 for releasably attaching to the support structure S of the rearview mirror M, a hinge defining means 56 pivotally connected to the upper end 32B of the upper female part 32 of the connector 14 and coupling the jaws 54 together to undergo pivotal movement relative to one another between closed and opened positions, as respective seen in solid and dashed line form in FIG. 6, and a pair of spaced apart fingers 58 attached to the jaws 54 on opposite sides of the hinge defining means 56. Also, the attaching clip 16 includes means in the form of a coiled spring 60 coupled between the fingers 58 for biasing the fingers away from one another to a displaced position, as shown in solid line form in FIG. 6, so as to force the jaws 54 to assume the closed position. The biasing spring 60 also is adapted to yield and be compressible by squeezing the fingers 58 toward one another in the direction of the arrows X shown in FIG. 6 to an adjacent position so as to force the jaws 54 to assume the opened position, as shown in dashed line form in FIG. 6. The compressive force generated by the coiled spring 60 is sufficient to maintain the jaws 54 in their closed position where they grip and attach the mounting device 10 on the support structure S of the rearview mirror M and support the radar detector unit U in the desired position.

Referring to FIGS. 1–3, 6 and 7, the hinge defining means 56 includes an upper coupling portion 62 and a lower coupling portion 64. The upper coupling portion 62 forms a cavity 66 and has defined therein a pair of vertically spaced apertures 68 respectively above and below the cavity. The hinge defining means 56 also includes respective tabs 70 attached to and extending outwardly from the jaws 54 of the clip 16 and toward one another and into overlapping relationship with one another into the cavity 66 of the upper coupling portion 62. The tabs 70 have respective openings 72 therein aligned with one another and with the apertures 68 of the upper coupling portion 62. The hinge defining means 56 further includes an elongated pivot pin 74 extending downward through the aligned apertures 68 and openings 72 so as to attach the clamping jaws 54 and therewith the fingers 58 to the upper coupling portion 62 of the hinge defining means 56 for undergoing pivotal movement toward and away from one another about a vertical axis defined by the pivot pin 74.

The lower coupling portion 64 of the hinge defining means 56 of the clip 16 is attached to and extends downwardly from the upper coupling portion 62 thereof and is rigidly attached to the upper end 32B of the upper female fastening part 32 of the connector 14 so as to allow the clip 16 to undergo pivotal movement relative to the connector 14, as seen in FIG. 2, between a plurality of desired angularly displaced positions to compensate for a given or preset angle of the support structure S of the rearview mirror M. The lower coupling portion 64 preferably takes the form of rigid flat bar 64 having a rounded lower end 64A and an opening 76 therethrough of substantially the same diameter as the openings 48 in the side wall portions 44 and being alignable therewith. The flat bar 64 has a width only slightly smaller than that of the slot 46. The slot 46 is particularly adapted for receiving the flat bar 64 in order to align its opening 76 with the openings 48 in the side wall portions 44 for receiving the screw 50 and nut 52 to pivotal fasten the clip 16 to the connector 14. The pivotal attachment or articulation of the lower coupling portion 64 to the upper female part 32 allows the clip 16 to undergo pivotal movement relative to the connector 14 between the plurality of angularly displaced positions. The biasing spring 60 at its opposite ends abuts against and extends between the fingers 58 and through and is captured by the cavity 66 of the upper coupling portion 62 of the hinge defining means 56 of the clip 16. The upper coupling portion 62 has a substantially wedge-shaped configuration.

Each jaw 54 of the clip 16 is made from the same blank of material as an adjacent one of the fingers 58 and is therefore interconnected with the adjacent finger 58. Each jaw 54 has a side wall 54A and a front wall 54B. The side wall 54A extends from a point of merger of the jaw 54 and the finger 58 to a point of merger with the front wall 54B. The front walls 54B extend inwardly at an angle from the point of merger with the side walls 54A to a point of abutment at the end edges 54C of the jaws 54 when the jaws 54 are in the closed position. Each finger 58 is substantially rectangular in shape and by operation of the biasing spring 60 remains separated from the opposite finger 58. Also, the respective tabs 70 on the jaws 54 extend horizontally outwardly from and in perpendicular relation to an interior side of the point of merger of each jaw 54 and each finger 58 for placement of each tab 70 adjacent to and in substantially flush contact with one another for insertion into the upper hinge defining portion 56. Finally, each finger 58 of the clip 16 has a series of parallel grooves 78 formed on an exterior side thereof so as to provide a gripping surface for the hand of the user for squeezing the fingers 58 toward one another from the outer displaced position to the inner adjacent position. All of the components of the mounting device 10 are further made substantially of a rigid material, such as a suitable plastic.

In view of the foregoing description, it can be readily understood and realized that the mounting device 10 of the present invention is simple and efficient to use, that radar detector units U of various sizes can be easily mounted to and dismounted from the device 10 and the device 10 itself can be easily attached to and removed from the rearview mirror M. The mounting device 10 is further versatile in that it can mount most any type of radar detector unit U and attach to the rearview mirror M of most any automobile model.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A radar detector unit mounting device for attachment to a vehicle rearview mirror, said device comprising:
   (a) a mounting bracket having a pair of upper and lower leg portions vertically spaced apart from one another and a bight portion extending between and connected to a pair of adjacent ends of said upper and lower leg portions so as to define a slot in said mounting bracket for receiving and supporting a radar detector unit therein between said upper and lower leg portions;
   (b) a connector attached to and extending upwardly from said upper leg portion of said mounting bracket; and
   (c) a clip attached to said connector and spaced above said mounting bracket, said clip having means for releasably attaching to a support structure of a rearview mirror, said clip including
      (i) a pair of clamping jaws for releasably attaching said clip to the support structure of the rearview mirror,
      (ii) a hinge defining means for connecting said jaws together to undergo pivotal movement relative to one another between closed and opened positions,
      (iii) a pair of spaced apart fingers attached to said jaws on opposite sides of said hinge defining means, and
      (iv) means coupled to said fingers for biasing said fingers away from one another to a displaced position so as to force said jaws to assume said closed position, said biasing means being adapted to yield by squeezing said fingers toward one another to an adjacent position so as to force said jaws to assume said opened position.

2. The device of claim 1 wherein said lower leg portion of said mounting bracket has an upper surface disposed in said slot between said upper and lower leg portions and means thereon for removably attaching the radar detector unit so as to releasably secure the radar detector unit in said slot between said upper and lower leg portions of said mounting bracket.

3. The device of claim 2 wherein said attaching means on said upper surface of said lower leg portion of said mounting bracket is a first patch of fastening material complementary to and releasably fastenable to a second patch of fastening material attached on a bottom surface of the radar detector unit.

4. The device of claim 1 wherein said bight portion of said mounting bracket has an opening for passage therethrough of electromagnetic energy to the radar detector unit.

5. The device of claim 1 wherein each said finger of said clip has a series of parallel grooves formed on an exterior side thereof so as to provide a gripping surface for the user for squeezing said fingers of said clip toward one another.

6. The device of claim 1 wherein said connector includes:
   an upper fastening part; and
   a lower fastening part adapted to fasten to and clamp said upper fastening part upon said upper leg portion of said mounting bracket.

7. A radar detector unit mounting device for attachment to a vehicle rearview mirror, said device comprising:
(a) a mounting bracket having a pair of upper and lower leg portions vertically spaced apart from one another and a bight portion extending between and connected to a pair of adjacent ends of said upper and lower leg portions so as to define a slot in said mounting bracket for receiving and supporting a radar detector unit therein between said upper and lower leg portions;
(b) a connector attached to and extending upwardly from said upper leg portion of said mounting bracket; and
(c) a clip attached to said connector and spaced above said mounting bracket, said clip having means for releasably attaching to a support structure of a rearview mirror;
(d) said connector including an upper fastening part and a lower fastening part, said upper fastening part being a female part, said lower fastening part being a male part adapted to fit through a hole in said upper leg portion of said mounting bracket and fit into and fasten to said upper female part so as to clamp said connector upon said upper leg portion of said mounting bracket.

8. The device of claim 7 wherein said lower male part of said connector is substantially cylindrical in shape with external threads thereon and a lower end of said upper female part has a cavity formed therein substantially cylindrical in shape with internal threads formed therein for receiving said external threads of said lower male part for clamping said connector to said mounting bracket.

9. The device of claim 7 wherein said clip includes:
a pair of clamping jaws for releasably attaching said clip to the support structure of the rearview mirror;
a hinge defining means for connecting said jaws together to undergo pivotal movement relative to one another between closed and opened positions;
a pair of spaced apart fingers attached to said jaws on opposite sides of said hinge defining means; and
means coupled to said fingers for biasing said fingers away from one another to a displaced position so as to force said jaws to assume said closed position, said biasing means being adapted to yield by squeezing said fingers toward one another to an adjacent position so as to force said jaws to assume said opened position.

10. A radar detector unit mounting device for attachment to a vehicle rearview mirror, said device comprising:
(a) a mounting bracket having a pair of upper and lower leg portions vertically spaced apart from one another and a bight portion extending between and connected to a pair of adjacent ends of said upper and lower leg portions so as to define a slot in said mounting bracket for receiving and supporting a radar detector unit therein between said upper and lower leg portions;
(b) a connector attached to and extending upwardly from said upper leg portion of said mounting bracket, said connector including an upper fastening part and a lower fastening part adapted to fasten to and clamp said upper fastening part upon said upper leg portion of said mounting bracket; and
(c) a clip attached to said connector and spaced above said mounting bracket, said clip having means for releasably attaching to a support structure of a rearview mirror, said clip including
(i) a pair of clamping jaws for releasably attaching said clip to the support structure of the rearview mirror,
(ii) a hinge defining means mounted to said upper fastening part of said connector and coupling said jaws together to undergo pivotal movement relative to one another between closed and opened positions,
(iii) a pair of spaced apart fingers attached to said jaws on opposite sides of said hinge defining means, and
(iv) means coupled to said fingers for biasing said fingers away from one another to a displaced position so as to force said jaws to assume said closed position, said biasing means being adapted to yield by squeezing said fingers toward one another to an adjacent position so as to force said jaws to assume said opened position.

11. The device of claim 10 wherein said hinge defining means includes:
an upper coupling portion forming a cavity and having defined therein a pair of vertically spaced apertures respectively above and below said cavity;
tabs attached to and extending outwardly from said jaws of said clip and toward one another and into overlapping relationship with one another into said cavity of said upper coupling portion, said tabs having respective openings therein aligned with one another and with said apertures of said upper coupling portion; and
an elongated pivot pin extending through said aligned apertures and openings so as to pivotally attach said jaws and therewith said fingers to said upper coupling portion of said hinge defining means.

12. The device of claim 11 wherein said hinge defining means includes a lower coupling portion attached to and extending downwardly from said upper coupling portion of said clip and being attached to an upper end of said upper fastening part of said connector so as to allow said clip to undergo pivotal movement relative to said connector between a plurality of angularly displaced positions to compensate for a preset angle of the support structure of the rearview mirror.

13. A radar detector unit mounting device for attachment to a rearview mirror of an automobile, said device comprising:
(a) a mounting bracket for receiving and holding a radar detector unit;
(b) a connector attached to and extending upwardly from said mounting bracket; and
(c) a clip pivotally attached to said connector and spaced above said mounting bracket, said clip being adapted to releasably attach to a support structure of the rearview mirror, said clip including
(i) a pair of clamping jaws for releasably attaching said clip to the support structure of the rearview mirror,
(ii) a hinge defining means mounted to said connector and coupling said jaws together to undergo pivotal movement relative to one another between closed and opened positions,
(iii) a pair of spaced apart fingers attached to said jaws on opposite sides of said hinge defining means; and
(iv) means extending between and coupled to said fingers for biasing said fingers away from one another to a displaced position so as to force said jaws to assume said closed position, said biasing means being adapted to yield by squeezing said fingers toward one another to an adjacent position so as to force said jaws to assume said opened position.

14. The device of claim 13 wherein said hinge defining means includes:
an upper coupling portion forming a cavity and having defined therein a pair of vertically spaced apertures respectively above and below said cavity;

tabs attached to and extending outwardly from said jaws of said clip and toward one another and into overlapping relationship with one another into said cavity of said upper coupling portion, said tabs having respective openings therein aligned with one another and with said apertures of said upper coupling portion; and an elongated pivot pin extending through said aligned apertures and openings so as to pivotally attach said jaws and therewith said fingers to said upper coupling portion of said hinge defining means.

15. The device of claim 14 wherein said hinge defining means includes a lower coupling portion attached to and extending downwardly from said upper coupling portion of said clip and being attached to an upper end of said connector so as to allow said clip to undergo pivotal movement relative to said connector between a plurality of angularly displaced positions to compensate for a preset angle of the support structure of the rearview mirror.

16. The device of claim 13 wherein said connector includes:

an upper fastening part; and a lower fastening part adapted to fasten to and clamp said upper fastening part upon an upper portion of said mounting bracket.

17. The device of claim 16 wherein:

said upper fastening part is a female part; and said lower fastening part is a male part adapted to fit through a hole in said upper portion of said mounting bracket and fit into and fasten to said upper female part so as to clamp said connector upon said upper portion of said mounting bracket.

18. The device of claim 17 wherein said lower male part of said connector is substantially cylindrical in shape with external threads thereon and a lower end of said upper female part has a cavity formed therein substantially cylindrical in shape with internal threads formed therein for receiving said external threads of said lower male part for clamping said connector to said mounting bracket.

19. The device of claim 16 wherein said hinge defining means includes:

an upper coupling portion forming a cavity and having defined therein a pair of vertically spaced apertures respectively above and below said cavity;

tabs attached to and extending outwardly from said jaws of said clip and toward one another and into overlapping relationship with one another into said cavity of said upper coupling portion, said tabs having respective openings therein aligned with one another and with said apertures of said upper coupling portion; and an elongated pivot pin extending through said aligned apertures and openings so as to pivotally attach said jaws and therewith said fingers to said upper coupling portion of said hinge defining means.

20. The device of claim 19 wherein said hinge defining means includes a lower coupling portion attached to and extending downwardly from said upper coupling portion of said clip and being attached to an upper end of said upper fastening part of said connector so as to allow said clip to undergo pivotal movement relative to said connector between a plurality of angularly displaced positions to compensate for a preset angle of the support structure of the rearview mirror.

* * * * *